US011516202B2

(12) United States Patent
Kochhar et al.

(10) Patent No.: US 11,516,202 B2
(45) Date of Patent: Nov. 29, 2022

(54) SINGLE SIGN ON (SSO) CAPABILITY FOR SERVICES ACCESSED THROUGH MESSAGES

(71) Applicant: VMWARE, INC., Palo Alto, CA (US)

(72) Inventors: Arjun Kochhar, Bengaluru (IN); Suman Aluvala, Bengaluru (IN); Amit Yadav, Bengaluru (IN); Shree Harsha Shedigumme, Bengaluru (IN)

(73) Assignee: VMWARE, INC., Palo Alto, CA (US)

( * ) Notice: Subject to any disclaimer, the term of this patent is extended or adjusted under 35 U.S.C. 154(b) by 184 days.

(21) Appl. No.: 16/790,776

(22) Filed: Feb. 14, 2020

(65) Prior Publication Data

US 2021/0203653 A1 Jul. 1, 2021

(30) Foreign Application Priority Data

Dec. 26, 2019 (IN) .............................. 201941053868

(51) Int. Cl.
*H04L 29/06* (2006.01)
*H04L 9/40* (2022.01)
*H04L 41/22* (2022.01)

(52) U.S. Cl.
CPC .......... *H04L 63/0815* (2013.01); *H04L 41/22* (2013.01); *H04L 63/029* (2013.01); *H04L 63/0823* (2013.01); *H04L 63/20* (2013.01); *H04L 63/30* (2013.01)

(58) Field of Classification Search
CPC . H04L 63/0815; H04L 63/0823; H04L 41/22; H04L 63/30; H04L 63/029; H04L 63/20; H04L 63/0838; H04L 63/0272
See application file for complete search history.

(56) References Cited

U.S. PATENT DOCUMENTS

| 7,536,722 B1* | 5/2009 | Saltz | H04L 9/3226 726/20 |
| 2002/0162026 A1* | 10/2002 | Neuman | H04L 63/062 726/4 |
| 2003/0226036 A1* | 12/2003 | Bivens | H04L 63/0815 726/8 |
| 2005/0039008 A1* | 2/2005 | Bhatia | H04L 63/0815 713/170 |

(Continued)

FOREIGN PATENT DOCUMENTS

| CN | 101060520 A | 10/2007 | |
| WO | WO-2015080571 A1 * | 6/2015 | ............. G06F 17/30 |

*Primary Examiner* — John B King
(74) *Attorney, Agent, or Firm* — Thomas | Horstemeyer, LLP

(57) ABSTRACT

Disclosed are various approaches for facilitating single sign-on (SSO) for third-party services that are accessible through messages (e.g., email) received by a user. A user can receive a message that includes an embedded URL or link that opens in a third-party service that requires authentication. Instead of requiring the user to enter authentication credentials for accessing the third-party service, a tunnel service can be used to intercept requests for authentication and redirect the requests to an identity manager that can issue a SSO token following an authentication of the user and device. Upon supplying the third-party service with the SSO token, the user can access the content associated with the third-party service without entering authentication credentials.

20 Claims, 8 Drawing Sheets

(56) References Cited

U.S. PATENT DOCUMENTS

| | | | |
|---|---|---|---|
| 2007/0244973 A1* | 10/2007 | Pearson | G06Q 10/107 709/206 |
| 2011/0126002 A1* | 5/2011 | Fu | H04L 63/0823 713/156 |
| 2011/0231919 A1* | 9/2011 | Vangpat | G06F 21/31 726/8 |
| 2011/0277026 A1* | 11/2011 | Agarwal | H04L 63/0815 726/8 |
| 2012/0011578 A1* | 1/2012 | Hinton | H04L 63/0815 726/8 |
| 2012/0072979 A1 | 3/2012 | Cha et al. | |
| 2013/0086670 A1* | 4/2013 | Vangpat | H04L 63/0815 726/8 |
| 2013/0254867 A1* | 9/2013 | Koster | G06F 21/51 726/10 |
| 2015/0163206 A1* | 6/2015 | McCarthy | H04L 63/104 726/4 |
| 2016/0050193 A1* | 2/2016 | Kanov | H04W 12/069 726/7 |
| 2017/0026362 A1* | 1/2017 | O'Donnell | H04L 63/0807 |
| 2017/0093868 A1 | 3/2017 | Slavov et al. | |
| 2017/0289140 A1 | 10/2017 | Cai et al. | |
| 2018/0159843 A1* | 6/2018 | Sajja | H04L 9/0894 |
| 2019/0372962 A1 | 12/2019 | Maria et al. | |
| 2020/0007531 A1* | 1/2020 | Koottayi | H04L 67/146 |
| 2020/0076793 A1* | 3/2020 | Kato | H04L 63/0815 |
| 2020/0106766 A1* | 4/2020 | Suraparaju | H04L 67/2814 |

* cited by examiner

SINGLE SIGN ON (SSO) CAPABILITY FOR SERVICES ACCESSED THROUGH MESSAGES

RELATED APPLICATIONS

Benefit is claimed under 35 U.S.C. 119(a)-(d) to Foreign Application Serial No. 201941053868 filed in India entitled "SINGLE SIGN ON (SSO) CAPABILITY FOR SERVICES ACCESSED THROUGH MESSAGES" on Dec. 26, 2019, by VMWARE, Inc., which is herein incorporated in its entirety by reference for all purposes.

BACKGROUND

With the emergence of bring-your-own-device (BYOD) technology in the workplace, enterprises permit employees or other personnel to use their own devices for business purposes. This can include accessing enterprise data, such as email and corporate documents. However, prior to an employee using his or her own device in the workplace, a company can require the employee to enroll with a management service capable of protecting enterprise data from theft, loss, and unauthorized access.

In the enterprise setting, individuals can utilize a number of different services and applications that are provided by the enterprise. Some of these services are hosted in a third-party environment and some can be hosted on servers operated by the enterprise. These individuals can use authentication credentials to login to these application or services. For example, a user might have an email account or an account with a third-party customer relationship management service. Accessing data within these services can be accomplished through a device with which the user is authenticated and which may have an authentication token associated with the user's identity.

However, in some situations, a user may receive an email, or other type of message, that includes an embedded uniform resource locator (URL) or a link, that upon selection, opens in another application and requires a user to enter his or her credentials for the application. However, the user may access the email from a device other than the device that contains the authentication token that allows for access to the service. For example, the authentication token may be set up on a user's desktop and the user accesses the email through his or her mobile device. In another example, the user may be outside his or her enterprise which may require additional authentication if the user is outside the enterprise network. As such, the user may not be able to access the data immediately or the user will have to enter authentication credentials that are not normally required. Further, the embedded URL or link may open an application that may need to be installed or otherwise set-up on the user's device. As such, the user may be unable to immediately access the data associated with the link. Being unable to immediately access the data associated with the service or having to continually enter authentication credentials can be frustrating to a user over time.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
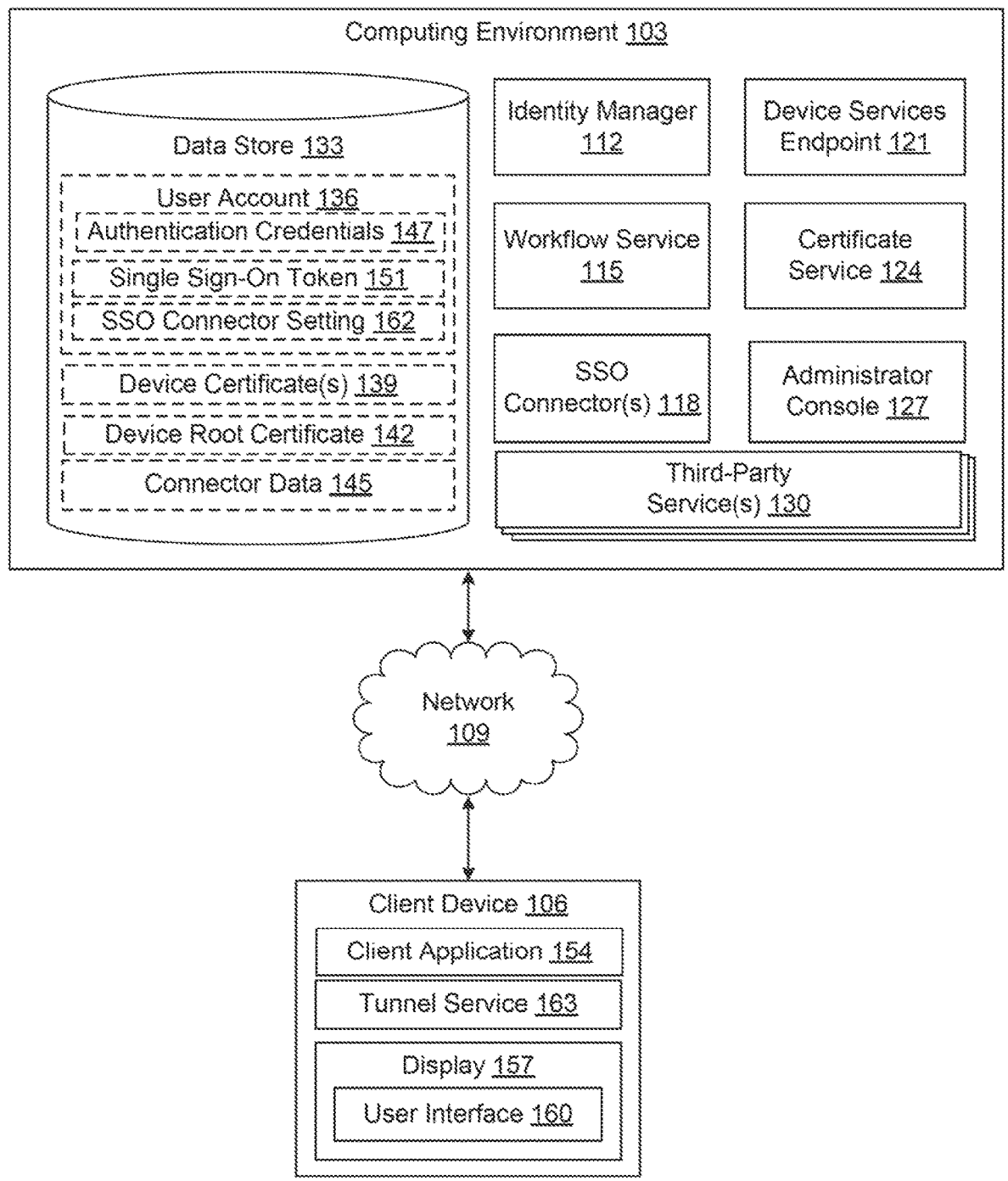
FIG. 1 is a schematic block diagram depicting an example of a network environment.

The present disclosure relates to facilitating single sign-on (SSO) capabilities for third-party services that are accessible through messages (e.g., email) received by a user. A user might have accounts in various services for which access is authenticated using an identity provider service utilized by the users's enterprise. The user can have an account with the enterprise that deploys an identity provider service to enable single sign-on capability for users of the enterprise. The identity provider can verify the user's identity within the enterprise and provide an authentication token that can be used to authenticate the user's access to other services, which may or may not be hosted by the enterprise. However, when a user receives a message that includes an embedded URL or link that opens in an application that requires authentication, there may be limitations to authenticate the user in the traditional process, thereby causing the user to have to manually enter credential information before the user can access the content from the message that is associated with the service.

According to various examples, the present disclosure allows a user to view content accessible through a selectable component in a message without requiring the user to enter authentication credentials when a service providing the content requires authentication. For example, a user belonging to an enterprise and having a managed device through a management service can enable a SSO connector that is configured to interact with a device service endpoint for authentication purposes. By enabling the SSO connector, the client application or messaging application that receives and displays the message can identify the service associated with the selectable component that requires authentication. Prior to the user requesting access to the service, the client application can request, via the SSO connector, the device credentials authenticating the user and/or the device without the user interacting with the management service. As such, if the user is outside of the enterprise, the user is still able to obtain device credentials.

Upon receiving the device certificate from the management service, the client application can initialize a tunnel service that can hook the system libraries of the user device and intercept network traffic between the client application and a network. As such, when the user selects the selectable component in the message (e.g., embedded URL or link) that opens the service that requires authentication, an authentication request received from the service can be intercepted and redirected to an identity provider service. Upon intercepting the authentication request from the service, the tunnel service can interact with the identity provider service by requesting authentication by providing the service authentication request and the device certificate obtained from the SSO connector. For example, the tunnel service can perform an SSL handshake with the identity provider service to obtain the authentication token required for authentication with the service. The tunnel service can forward the received authentication token to the service or client application for authentication. Upon authentication by the service, the client application can render a user interface that includes the contents associated with the embedded URL or link to provide the user access to the third-party service without requiring the user to manually enter authentication credentials or be within the enterprise network.

Beginning with FIG. 1, shown is an example of a networked environment 100. The networked environment 100 includes a computing environment 103 and a client device 106 which are in data communication with each other across a network 109. The network 109 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 112, a workflow service 115, an SSO connector 118, a device services endpoint 121, a certificate service 124, and an administrator console 127. One or more third-party services 130 can also be executed in the computing environment 103. In some embodiments, however, one or more of the third-party services 130 can be executed in a separate computing environment that is in data communication with the computing environment 103 across the network 109.

Also, various data is stored in a data store 133 that is accessible to the computing environment 103. The data store 133 can be representative of a plurality of data stores, which can include relational databases, object-oriented databases, hierarchical databases, hash tables or similar key-value data stores, as well as other data storage applications or data structures. The data stored in the data store 133 is associated with the operation of the identity manager 112, the workflow service 115, the SSO connector 118, the device services endpoint 121, the certificate service 124, the administrator console 127, and one or more third-party services 130 as well as potentially other applications or functional entities described later. This data can include one or more user accounts 136, device certificate(s) 139, device root certificates 142, connector data 145, and potentially other data.

The identity manager 112 can authenticate users and manage user authorizations or permissions to access applications, data, or other computing resources. For example, the identity manager 112 can correspond to a single sign-on portal that verifies a user's authentication credentials 147, issues a single sign-on authentication token 151 that identifies the user, and verifies whether the user has the appropriate access permissions to access one or more third-party services 130. Examples of identity managers 112 include AMAZON's AWS Identity and Access Management (IAM) service, VMWARE's Identity Manager, or MICROSOFT's Active Directory Federation Services.

The workflow service 115 can manage enterprise workflows performed by users of the client devices 106. The workflow service 115 can also manage authentication with services that are utilized as backend services for the workflows. The workflow service 115 can monitor one or more services that a user is authorized to access. For example, the workflow service 115 can periodically query a service for notifications, updates, messages, changes, actions to be performed, or other events. If a notification, update, message, change, action to be performed, or other event is identified, the workflow service 115 can then notify the user. For example, the workflow service 115 can send a message to the client device 106 to notify the user. The operating system of the client device 106 can include a notification framework that provides a notification for the message using the client device 106. The notification can include a sound generated using an audio device, a visual notification using a display device 157, and haptic feedback using a haptic device.

The workflow service 115 can generate a request or receive a request from a client device 106. For example, the workflow service 115 can use the SSO connector 118, if enabled, to obtain certificate data that may be required by the client device 106 authentication of the user and/or device. Upon receiving a request for certificate data, the workflow service 115 can use the SSO connector 118, if enabled by the user, to fetch the requested data from the device services endpoint 121 and the certificate service 124. The SSO connector 118 can return the requested information to the workflow service 115, which can then return the requested information including the device certificate 139 to the client device 106.

The SSO connector 118 can refer to a service or component of the workflow service 115 that can fetch information that may be required by a user of a client device 106. The SSO connector 118 can handle communications with the various authentication services such as, for example, the identity manager 112, the device services endpoint 121, the certificate service 124, and/or other types of network services within the computing environment 103. For example, the SSO connector 118 can fetch information from the device services endpoint 121 or other device endpoint that can be used for authentication of the user and/or device 106. In this example, the SSO connector 118 can fetch the device certificate 139 that can be used by the client device 106 for the authentication that is required to receive an SSO token 151 for accessing a third-party service 130. The SSO connector 118 can include a local connector hosted in the computing environment 103, or an external connectors hosted external to the computing environment 103.

According to various examples, the SSO connector 118 is responsible for obtaining the device certificate 139 associated with the client device 106 requesting authentication. For example, the SSO connector 118 can interact with the device services endpoint 121 to retrieve the device root certificate 142 and a certificate location identifier, which are required for obtaining the device certificate 139 through the certificate service 124. In some examples, an administrator of the enterprise can configure the SSO connector 118 via interactions with the administrator console 127 to provide addresses or other information that can be used to connect with and fetch information from the various services within the computing environment 103. For example, the SSO connector 118 can be configured by an administrator to include an identity manager location identifier for communicating with the identity manager 112. In this example, the identity manager identifier can comprise a URL or other type of location identifier or address. In addition, the administrator can configure the SSO connector 118 with the certificate proxy domain and port for connecting with various authentication services, including the identity manager 112, and the device services endpoint 121.

The device services endpoint 121 can return certificate policies, device root certificates 142, enrollment data, client configuration data, or other data to the client device 106 managed by an enterprise in response to an appropriate request. In some examples, the SSO connector 118 can send a request to the device services endpoint 121 to obtain a device root certificate 142 associated with the client device 106. The device services endpoint 121 can further provide the SSO connector 118 with a certificate location identifier, such as, a simple certificate enrollment protocol (SCEP) URL, that can be used to obtain a device certificate 139 that can be used by the identity manager 112 when authenticating a device 106 and/or user for SSO capabilities for third-party services 130.

The certificate service 124 can issue device certificates 139 that can be used for authentication of a client device 106. In particular, the certificate service 124 can use a device root certificate 142 associated with a client device 106 to issue a device certificate 139 that can be used by the identity manager 112 to authenticate a device 106 for SSO capabilities to access one or more third-party services 130.

The administrator console 127 can provide an administrative interface for configuring the operation of individual components in the networked environment 100. For example, the administrator console 127 can provide an administrative interface for the workflow service 115 and the SSO connector 118. In this example, an administrator of an enterprise can configure the SSO connector 118 with a variety of operational configurations including, for example, an identity manager URL associated with the enterprise, a cert proxy domain and port corresponding to the enterprise, and any other component as can be appreciated. These configurations can allow the SSO connector 118 to retrieve certificate data, including the device root certificate 142 and device certificates 139 from the various services in the computing environment 103. In addition, the configurations can be used by the SSO connector to communicate with the identity manager 112 regarding the issuance of device certificates 139 for device authentication for SSO capabilities to access third-party services 130.

A third-party service 130 can be a web application, web service, or other network facing application that can be accessed using a shared identity manager 112. In some examples, a third-party service 130 can include enterprise-specific applications, device management applications, social networking applications, word processors, spreadsheet applications, media player applications, or other applications. One or more third-party services 130 can be provided by the same provider or by different providers. Example third-party services 130 can include SALESFORCE, JIRA, CONCUR, FACEBOOK, GITHUB, SERVICENOW, VMWARE WORKSPACE ONE, LINKEDIN, and other types applications.

The user account 136 represents information associated with a user. The information can include one or more authentication credentials 147, one or more single sign-on tokens 151, and SSO connector setting 162. Other information about the user can also be stored as part of the user account 136, such as the user's name or contact information.

The authentication credentials 147 represent the credentials that a user can present to the identity manager 112 to authenticate the user's identity. Authentication credentials 147 can include a combination of a username and password, a cryptographic certificate, a one-time password, or a combination of several of authentication credentials 147 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 151 is a software token generated by the identity manager 112 in response to a successful authentication of the user with the identity manager 112 using the authentication credentials 131, including the device certificate 139. The SSO token 151 can be used to provide the client device 106 access to various third-party services 130 on behalf of the authenticated user. In some instances, such as those implementing a version of the KERBEROS protocol, a separate SSO token 151 can be generated for each third-party service 130 that the client device 106 attempts to access on behalf of the user. In other instances, the single SSO token 151 can be generated and used to provide the client device 106 with access to several of the third-party services 130. Although each of the third-party services 130 can have a different set of authentication credentials 147 linked to the user account 136, such as a different user name and password combination, the SSO token 151 allows the user to authenticate once with the identity manager 112 in order to use each of the third-party services 130 of having to authenticate with each of the third-party services 130 separately.

The device root certificate 142 includes a device-specific root credential that is issued to the client device 106 when the client device 106 is enrolled as a managed device with a management service. The device root certificate 142 can be issued by the device services endpoint 121 and can be configured based on requirements of the identity manager 112. The device root certificate 142 can be used to issue other certificates, including the device certificate 139 that is returned to the requesting device 106 and used for SSO authentication with the identity manager 112.

The device certificate 139 can comprise a device-specific credential that is issued to the client device 106 via the certificate service 124 when the client device 106 is enrolled as a managed device with a management service. The device certificate 139 is issued by the certificate service 124 in response to a request from the SSO connector 118. The request from the SSO connector can include the device root certificate 142 provided by the device services endpoint 121 can be provided from the certificate service 124 in response to authenticating the device.

The connector data 145 includes configuration data associated with the SSO connector 118. As discussed, the SSO connector 118 can refer to a service or component of the workflow service 115 that can fetch information that may be required by a user of a client device 106. For example, the SSO connector 118 fetches certificate data from the device services endpoint 121 and the certificate service 124 for authentication via the identity manager 112. The connector data 145 can include the configurations of SSO connector 118 by an administrator. For example, the connector data 145 can include an identity manager location identifier for communicating with the identity manager 112. In this example, the identity manager identifier can comprise a URL or other type of location identifier or address. In addition, the connector data 145 can include a certificate proxy domain and port for connecting with various authentication services, including the identity manager 112, and the device services endpoint 121, as can be appreciated.

The client device 106 is representative of a plurality of client devices 106 that can be coupled to the network 109. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 157, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can execute various applications such as one or more client applications 154, a tunnel service 163, and/or other applications. The client application 154 can render a user interface 160 on the display 157. The client application 154 can represent various types of applications executable by the client device 106. For example, the client application 154 could be a web browser and the user interface 160 could include a web page rendered within a browser window. As another example, the client application 154 could be an email application and the user interface 160 could represent a graphical user interface for viewing, editing, and composing emails. Likewise, the client application 154 could be a chat or messaging application, and the user interface 160 could represent a graphical user interface for sending and receiving messages with another user.

The tunnel service 163 can be initialized by the client application 154 to intercept traffic between the client application 154 and the network. Upon initialization, the tunnel service 163 can hook the system libraries of the client device 106 to intercept the traffic between the client application 154 and the network 109. In this example, the tunnel service 163 can hook network system calls that are directed to the client application 154, and redirect the calls to other services. In various examples, the tunnel service 163 can intercept authentication requests received from a third-party service 130 in response to a user request to open or otherwise access the third-party service 130 via a selection of a selectable component included in a message rendered by the client application 154. Instead of providing the authentication request to the client application 154 which would result in the rendering of content that requires the user to enter authentication credentials for accessing the third-party service 130, the authentication request can be redirected to the identity manager 112 along with a device certificate 139 obtained by the SSO connector 118. The identity manager 112 can then authenticate the device 106 for SSO capabilities and transmit an SSO token 151 to the client application 154. The tunnel service 163 can intercept the SSO token 151 and redirect to the third-party service 130 to finalize the authentication of the user and device with the third-party service 130 without requiring the user to enter authentication credentials.

Figure 2A:
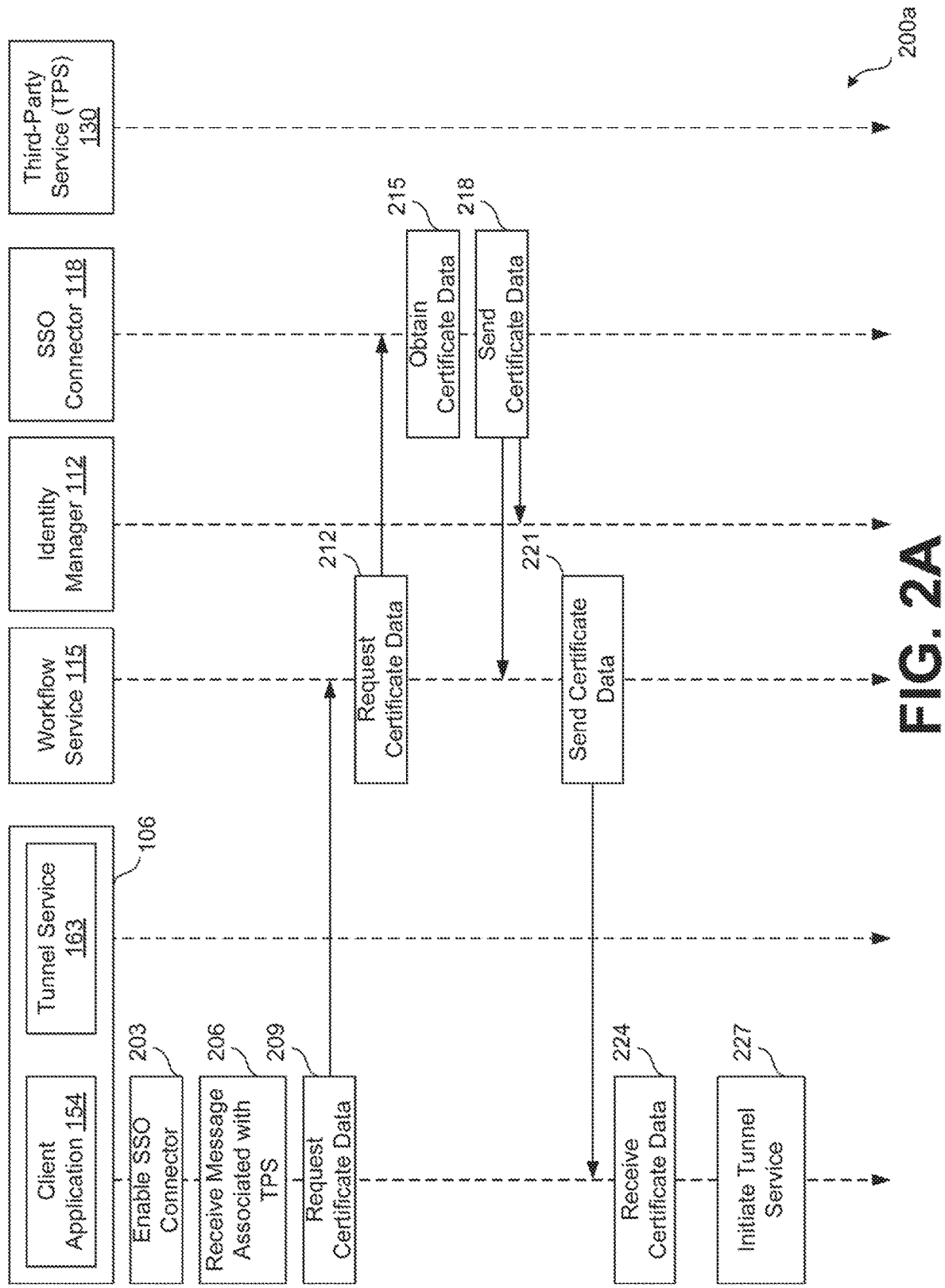
FIGS. 2A-2B are sequence diagrams depicting the operation of components of the network environment of FIG. 1.
Figure 2B:
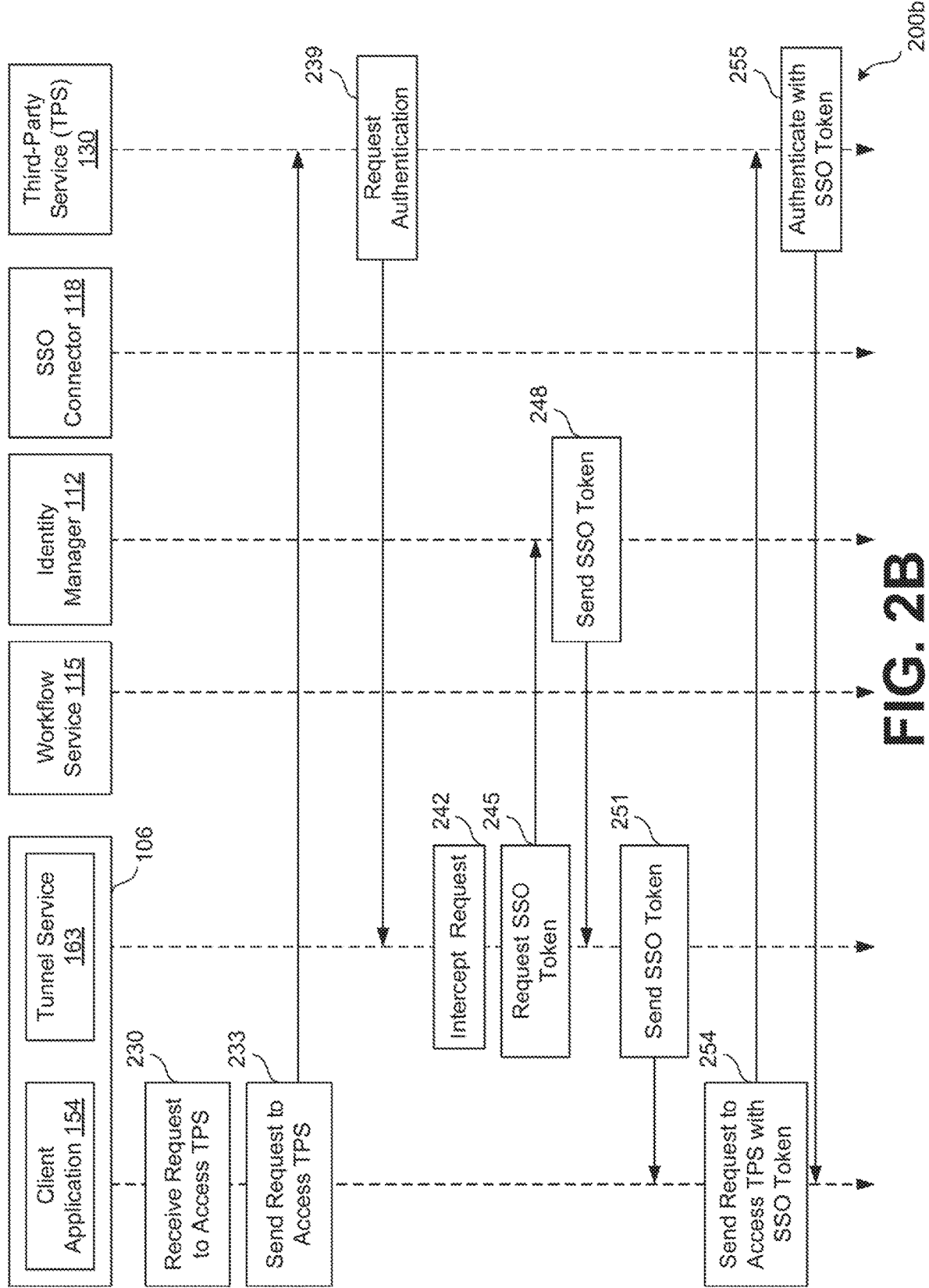

Turning now to FIGS. 2A and 2B, shown are sequence diagrams 200 (200a, 200b) illustrating functionality implemented by components of the networked environment. It is understood that the sequence diagrams of FIGS. 2A-2B provide merely an example of the many different types of functional arrangements that can be employed to implement the portions of the network environment 100 as described herein. As an alternative, the sequence diagrams of FIGS. 2A-2B can be viewed as depicting an example of elements of a method implemented within the network environment 100 in some implementations To begin, prior to step 203, a user of the client device 106 authenticates with the identity manager 112. For example, the identity manager 112 can generate and send a webpage to a browser executing on the client device 106. The user can use the webpage to submit his or her authentication credentials 131 to the identity manager 112. The identity manager 112 can then determine whether the submitted authentication credentials 131 match the authentication credentials 131 stored for the user account 136. If the authentication credentials 131 match, the identity manager 112 determines that the user is authenticated. In response, the identity manager 112 can generate an SSO token 151 to represent the authenticated user and device.

In addition, prior to step 203, an administrator of the enterprise associated with the user can interact with the administrator console 127 to configure the SSO connector 118 as required to link the authentication request for the SSO connector 118 with the authentication services, including the identity manager 112, the device services endpoint 121, the certificate service 124, and other services. For example, the administrator can configure the SSO connector 118 with a variety of operational configurations including, for example, an identity manager URL associated with the enterprise, a cert proxy domain and port corresponding to the enterprise, and any other component as can be appreciated. These configurations can allow the SSO connector 118 to retrieve certificate data, including the device root certificate 142 and device certificates 139 from the various services in the computing environment 103. In addition, the configurations can be used by the SSO connector to communicate with the identity manager 112 regarding the issuance of device certificates 139 for device authentication for SSO capabilities to access third-party services 130. The administrator can further configure the SSO connector 118 to define the authentication mechanism that is needed to authenticate a user for SSO. For example, the administrator can configure the SSO connector 118 to ensure that the SSO connector complies with a version of the OAUTH protocol, the SAML protocol or other suitable protocol.

At step 203, a user interacting with a client application 154 can enable the workflow service 115. Once enabled, the SSO connector 118 can obtain device certificates 139 without requiring the user to interact with a management service or other authenticating services for additional authentication. Enabling the SSO connector 118 provides flexibility for the user as the SSO connector 118 can initiate the process by which SSO capabilities can be established in third-party services 130 without requiring the user to enter credential information. Alternatively, the workflow service 115 and therefore the SSO connector 118 can be enabled automatically or by a system administrator.

At step 206, the client application 154 can receive a message 300 (FIG. 3A) that is associated with a third-party service 130. For example, the message may include a selectable component 303 (FIG. 3A), that when selected, directs the client application 154 to open or otherwise access the third-party service 130. The selectable component 303 can include an embedded URL, a link, or other type of address for accessing a third-party service 130. For example, upon user selection, the selectable component can be configured to redirect the user to the associated third-party service 130. In various examples, the client application 154 can identify the third-party service 130 associated with the message 300. For example, the client application 154 can identify the third-party service 130 associated with the message 300 based on message properties including in the message 300 or message header. In another example, the sender of the message can be used to identify the third-party service 130 associated with the message 300. For example, the sender's email address may include the name of the third-party service 130, and the client application 154 can parse the email address to identify the email address. In some examples, the server from which the message was sent can be used to identify the third-party service 130.

At step 209, the client application 154 can send a request to the workflow service 115 for certificate data that can be used to authenticate the device and user. As discussed, the workflow service 115 can manage enterprise workflows performed by users of the client devices 106. As such, the client application 154 can request that the workflow service 115 return the credential data required to authenticate the device and user. In some examples, the request to the workflow service 115 can include an identity manager token associated with the user that can be used by the device services endpoint 121 to obtain the device root certificate 142.

At step 212, the workflow service 115 receives the request from the client application 154 for certificate data. The workflow service 115 can determine that the SSO connector 118 is enabled and forward the request and corresponding identity manager token of the user to the SSO connector 118.

At step 215, the SSO connector 118 can obtain the certificate data that can be used to authenticate the device and user for SSO through the identity manager. The SSO connector 118 is configured with the identity manager identifier and cert proxy domain and port for fetching information from the authentication services, including the device services endpoint 121, the certificate service 124, the identity manager 112, or other services. Upon receiving the request for certificate data, the SSO connector 118 can send a request to the device services endpoint 121. The request can include an identity manager token for the user which can be used by the device services endpoint 121 to issue the device root certificate 142 for the device 106. The device services endpoint 121 can further provide the SSO connector 118 with a certificate services location identifier, such as a SCEP URL, which can be used by the SSO connector to request issuance of the device certificate 139 for authenticating the user and device for SSO capabilities.

At step 218, the SSO connector 118 sends the obtained certificate data to the workflow service 115 and to the identify manager 112. For example, the SSO connector 118 can send the certificate data, including the device certificate 139, to the workflow service 115. In addition, the SSO connector 118 can push the device root certificate 142 to the identity manager 112 for authentication. At step 221, the workflow service 115 sends the certificate data, including the device certificate 139 to the client application 154. As such, at step 224, the client application 154 is able to obtain certificate data without the user having to directly interact with the management service of the enterprise.

At step 227, the client application 154 can initiate the tunnel service 163. Upon initialization, the tunnel service 163 can hook the system libraries of the client device 106 to intercept the traffic between the client application 154 and the network 109. For example, the tunnel service 163 can hook network system calls that are directed to the client application 154, and redirect the calls to other services.

Turning now to FIG. 2B, at step 230, the client application 154 can receive a request to access the third-party service 130 via interactions with the content of the message 300. For example, the user may select the selectable component 303 that, upon selection, can open or otherwise access the third-party service 130. In some examples, the user selects the selectable component 303 in response to a prompt (e.g., pop-up box) that instructs the user to select the selectable component 303. In other examples, the user can select the selectable component 303 unprompted. Selection of the selectable component 303 can generate the request to access the third-party service 130.

At step 233, the client application 154 sends the request to the third-party service 130 requesting access to or otherwise content provided by the third-party service 130 in response to the selection of the selectable component in the message. Since the request to the third-party service 130 corresponds to a network system call, the tunnel service 163 can intercept the request.

At step 239, the third-party service 130 can send a request for authentication credentials for the user and device 106 to the client application 154 prior to providing the requested content. The request for authentication credentials occurs following receipt of the request for content and access to the third-party service 130 that was forwarded by the tunnel service 163 after intercepting the original request from the client application 154.

At step 242, the tunnel service 163 intercepts the authentication credentials request from the third-party service 130. The tunnel service 163 can determine that the authentication credentials request can be redirected to the identity manager 112 to complete authentication of the user and device.

At step 245, the tunnel service 163, sends a request for a SSO token 151 to the identity manager 112. The request for the SSO token 151 can further include the device certificate 139 and other certificate data that may be required by the identity manager 112 to complete authentication of the user and device for issuance of the SSO token 151. In some examples, the tunnel service 163 can performing a secure sockets layer (SSL) handshake with the identity manager 112 to obtain the SSO token 151. For example, the SSL handshake can occur using the device certificate 139 for fetching the SSO token.

At step 248, the identity manager 112 can authenticate the device and user and issue the SSO token 151 that can be used for authentication for the third-party service 130. In various examples, the SSO token 151 can be in response to in an authentication request that complies with a version of the OAUTH protocol, the SAML protocol or other suitable protocol. Upon authenticating the device and user, the identity manager 112 sends the SSO token 151 to the client application 154.

At step 254, the client application 154 can send the request to access the third-party service or content provided by the third-party service 130. The request at step 254 includes the SSO token 151 provided by the identity manager 112.

At step 255, the third-party service 130 authenticates the user and device 106 and provides access to the third-party service 130 and content provided by the third-party service 130. The authentication occurs without requiring the user to enter authentication credentials for authentication. Upon authentication, the client application can render a web view or user interface 160 that includes the content associated with the third-party services 130. As such, the user can immediately access the content associated with the third-party service 130 through interactions with a selectable component 303 included in a message 300 received by the client application 154.

Figure 3A:
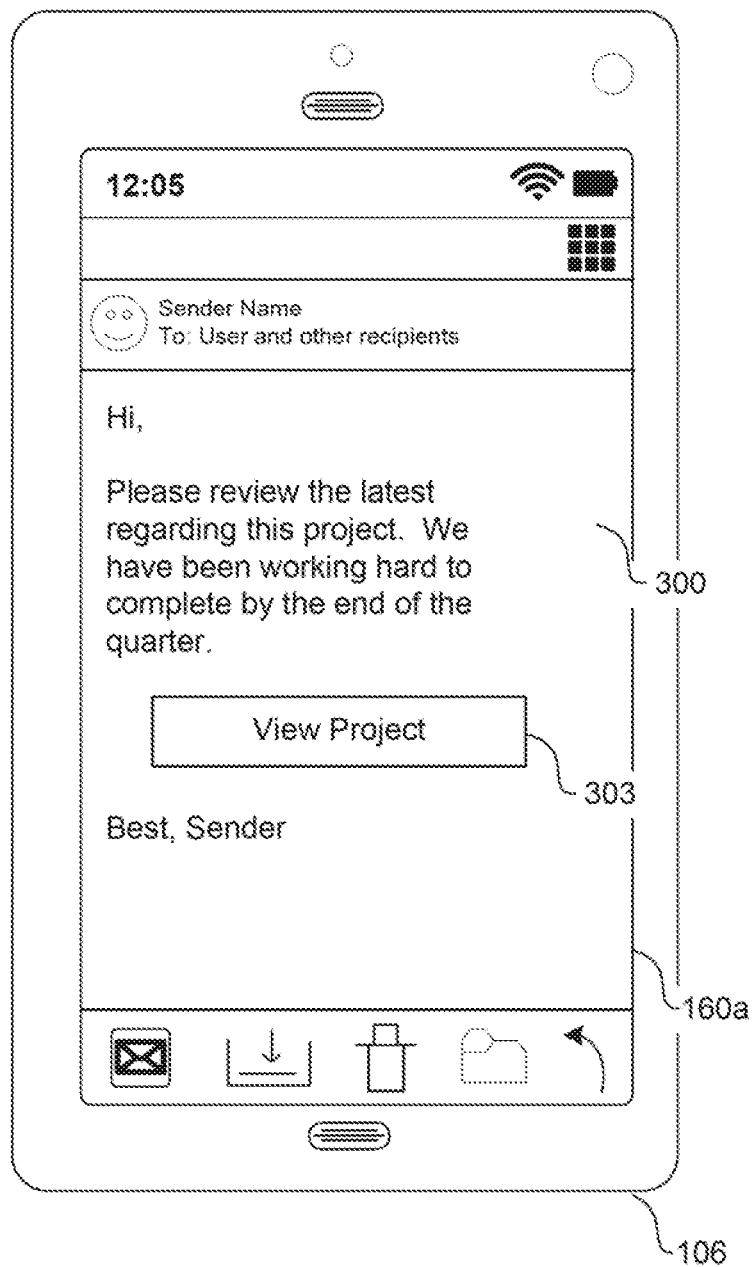
FIGS. 3A-3C are example user interfaces of a client application executed on a client device of the network environment of FIG. 1.
Figure 3B:
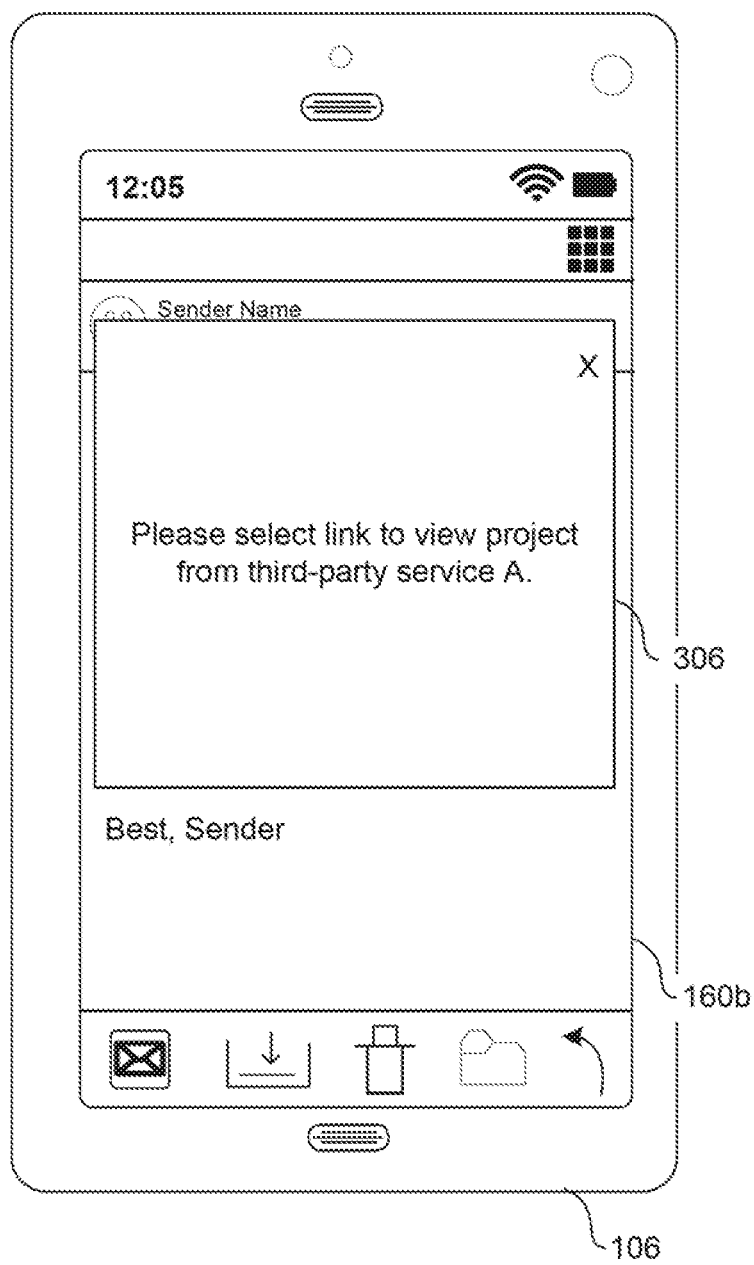
Figure 3C:
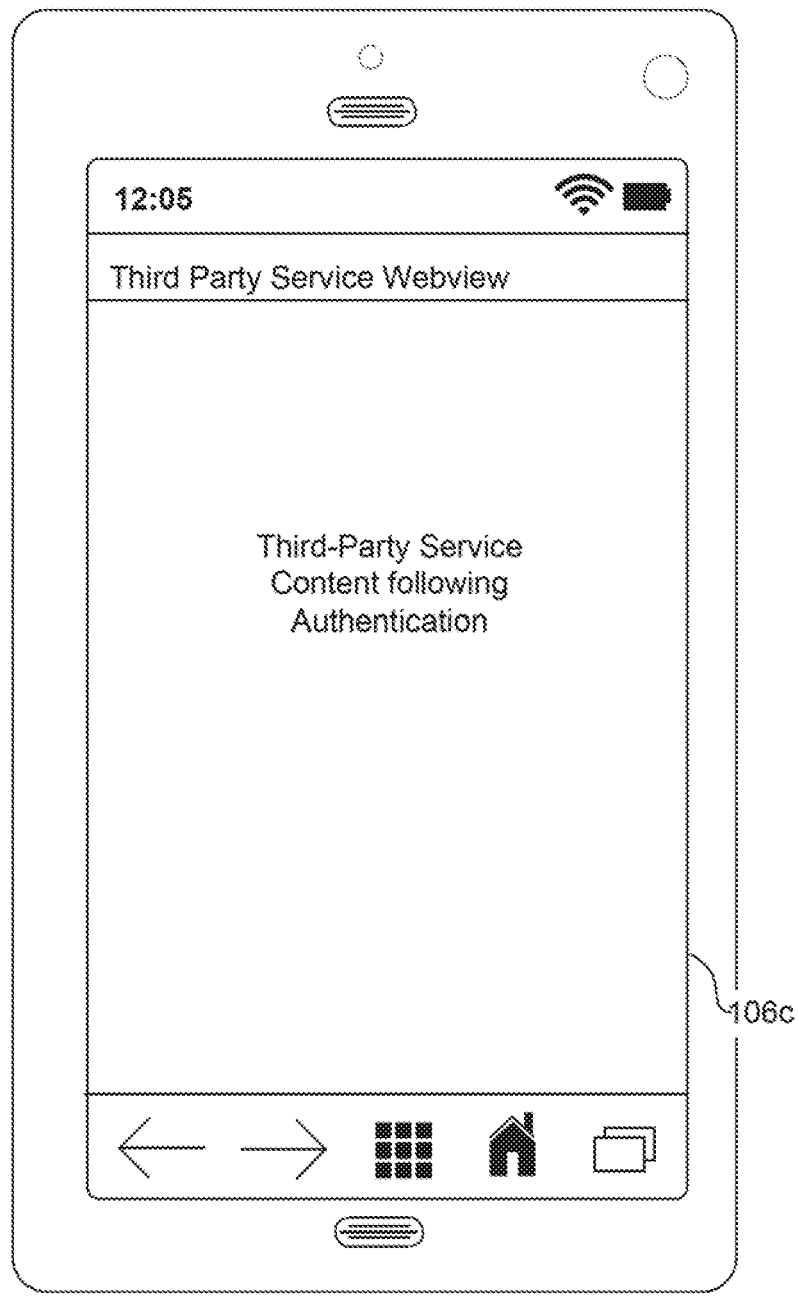

Moving on to FIGS. 3A-3C, shown are examples of user interfaces 160 (e.g., 160a, 160b, 160c) that can be rendered by the client application 154 of the client device 106. In particular, FIG. 3A illustrates a user interface 160 that includes a message 300 received by the client application 154 and displayed to the user interacting with the client application 154. The message 300 includes a selectable component 303 that when selected opens or requires access to a third-party service 130. In this example, the third-party service 130 requires authentication to open. Understanding that authentication is required to access the content accessible through selection of the selectable component 303, the client application 154 can begin the authentication process by requesting certificate data from the workflow service 115.

FIG. 3B illustrates an example user interface 160b that can be displayed to the user in order to prompt the user to select the selectable component 303. In particular, FIG. 3B includes a notification 306 that can be generated and rendered on the user interface requesting the user to select the selectable component 303. In some examples, the notification 306 is displayed in response to receiving the certificate data from the workflow service 115. As such, the prompt can provide an indication that authentication is in process. Although the notification 306 is shown as a pop-up component, the notification 306 can include an overlay interface, drop-down box, a card component and/or other type of user interface element 115 as can be appreciated.

FIG. 3C illustrates an example user interface 160c that can be displayed to the user in response to the user selecting the selectable component 303. In particular, FIG. 3C includes content provided by the third-party service 130 associated with the selectable component 303. Instead of the user being directed to a sign-on page for entering authentication credentials to access the third-party service 130, the user is presented a view of the actual content associated with the selectable component 303 as the backend functionality has provided the SSO token 151 to the third-party service 130 for authentication. As such, the user can immediately access the content without the extra steps required by the user to authenticate. Furthermore, the client application 154 is able to provide access to the content by providing a web view instead of redirecting the user to a separate third-party service 130.

Figure 4:
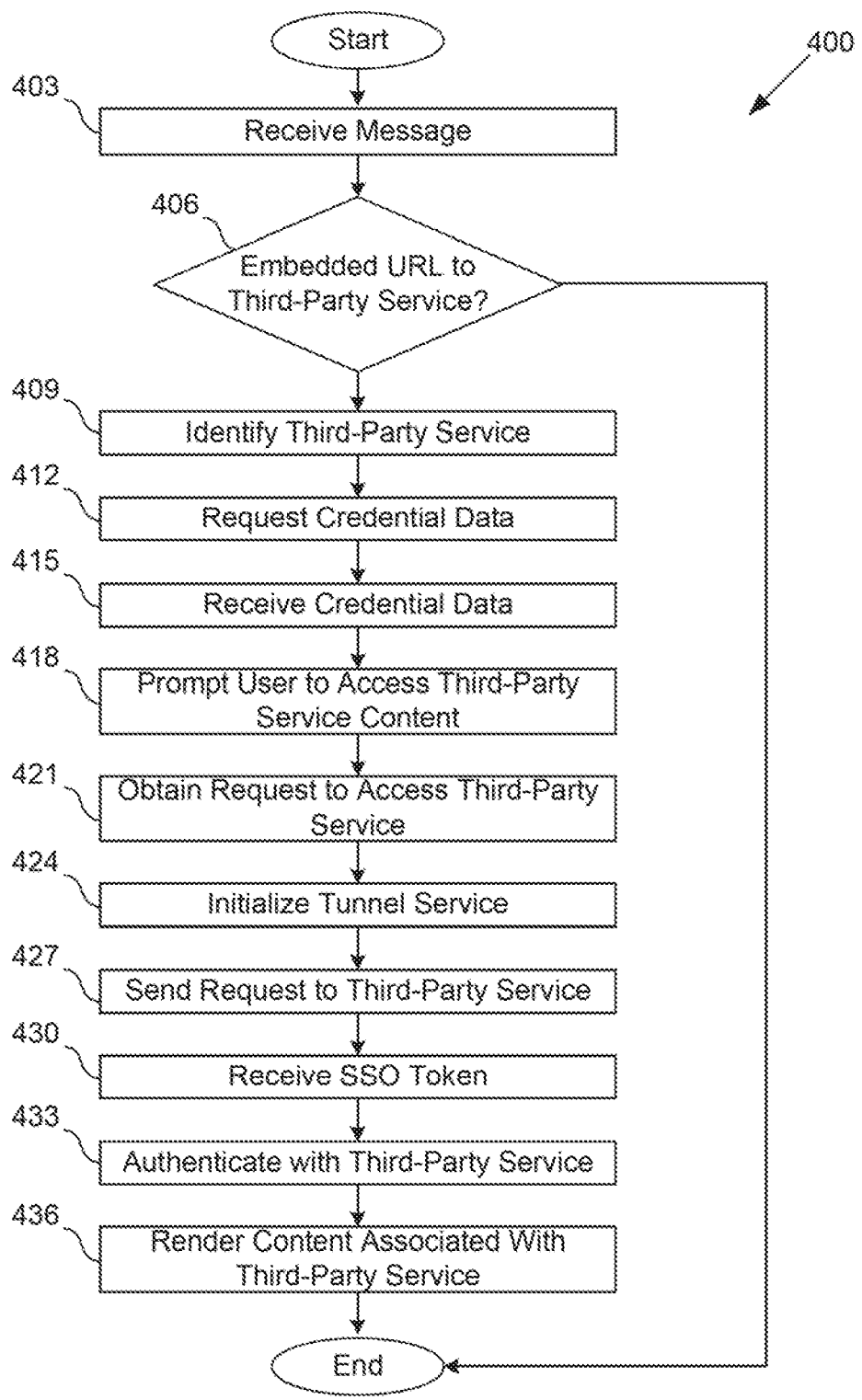
FIG. 4 is a flowchart depicting the operation of an example of a component of the client device of the network environment of FIG. 1.

Moving on to FIG. 4, shown is a flowchart 400 that provides one example of the operation of a portion of the network environment 100. The flowchart of FIG. 4 can be viewed as depicting an example of elements of a method implemented by the client application 154, or other components executing in the computing environment 103. The separation or segmentation of functionality as discussed herein is presented for illustrative purposes only.

Beginning with step 403, the client application 154 receives a message 300 from a sender. For example, the client application 154 can include an email application and the message 300 can include an email message obtained from an email server. In some examples, the message 300 can be sent from an entity associated with a third-party service 130. In other examples, the message 300 can be sent from an entity unassociated with the third-party service 130. However, regardless of the sender, the message 300 can include content that is associated with a third-party service 130.

At step 406, the client application 154 determines if the message 300 includes a selectable component, such as an embedded URL or link that is associated with a third-party service 130. For example, the selectable component 303, when selected, can correspond to an address or link that redirects the user to a third-party service 130. If the message 300 fails to include the selectable component 303, this portion of the process proceeds to completion. Otherwise, the client application 154 proceeds to step 409.

At step 409, the client application 154 identities the third-party service 130 associated with the selectable component 303 included in the message. For example, the message 300 can include metadata that can be used to identify the third-party service 130. In another example, the embedded URL or link of the selectable component 303 may be parsed to identify the third-party service 130.

At step 412, the client application 154 sends a request over the network 109 to a workflow service 115 requesting certificate data for the device 106. For example, the device 106 may be a managed device in an enterprise and the certificate data can be used to authenticate the user and device based on user account information and device data associated with the managed account. The workflow service 115 can use the SSO connector 118, if enabled, to obtain certificate data that may be required by the client device 106 authentication of the user and/or device. In various examples, the request can include an identity manager token assigned to the user that can be passed to the SSO connector 118 to obtain the required authentication data.

At step 415, the client application 154 receives the certificate data from the workflow service 115. As discussed in FIG. 5, the SSO connector 118 can be configured to fetch certificate data associated with the device and authenticate the certificate based on the configurations of the identity manager 112 and the client device 106 with the identity manager 112. The certificate data can include a device certificate 139 issued to the device 106 from the certificate service 124.

At step 418, the client application 154 can generate a notification 306 requesting a user to select the selectable component 303 to access the content of the third-party service 130. The client application 154 can further render or otherwise display the notification 306 on the display 157 of the client device 106 in response to receiving the certificate data from the workflow service 115. As such, the prompt can provide an indication that authentication is in process. The notification 306 can include an overlay interface, a pop-up component, drop-down box, a card component and/or other type of user interface element 115 as can be appreciated.

At step 421, the client application 154 can obtain a request to access the third-party service 130. The request can be generated upon selection by a user of the selectable component 303 in order to access the content of the third-party service 130.

At step 424, the client application 154 can initialize the tunnel service 163. Upon initialization, the tunnel service 163 can hook the system libraries of the client device 106 to intercept the traffic between the client application 154 and the network 109. For example, the tunnel service 163 can hook network system calls that are directed to the client application 154, and redirect the calls to other services.

At step 427, the client application 154 sends the content request to the third-party service 130. The third-party service 130 may require authentication from the user and device. As such, in response to receiving the content request from the client application 154, the third-party service 130 may respond with a request for authentication credentials.

At step 430, the client application 154 can receive an SSO token 151 from the identity manager 112 to be used to access the content of the third-party service 130. Unbeknownst to the client application 154, the tunnel service 163 intercepted the authentication request from the third-party service 130 and redirected the request to the identity manager 112 along with the obtained device certificate 139 from the workflow service 115. As such, the SSO token 151 is returned in response to the redirected request.

At step 433, the client application 154 authenticates with the third-party service 130 by sending the SSO token 151 to the third-party service 130. As such, the third-party service 130 can authenticate the user and device 106 in response to receiving the SSO token 151.

At step 436, the client application 154 renders the content associated with the third-party service 130 in a user interface 160 associated with the client application 154. For example, the client application 154 can generate a web view that includes the content of the third-party service 130. Accordingly, the user is able to access the content of the third-party service 130 from the received message 300 without entering authentication credentials or being redirected from the client application 154 to the third-party service 130. Thereafter, the process proceeds to completion.

Figure 5:
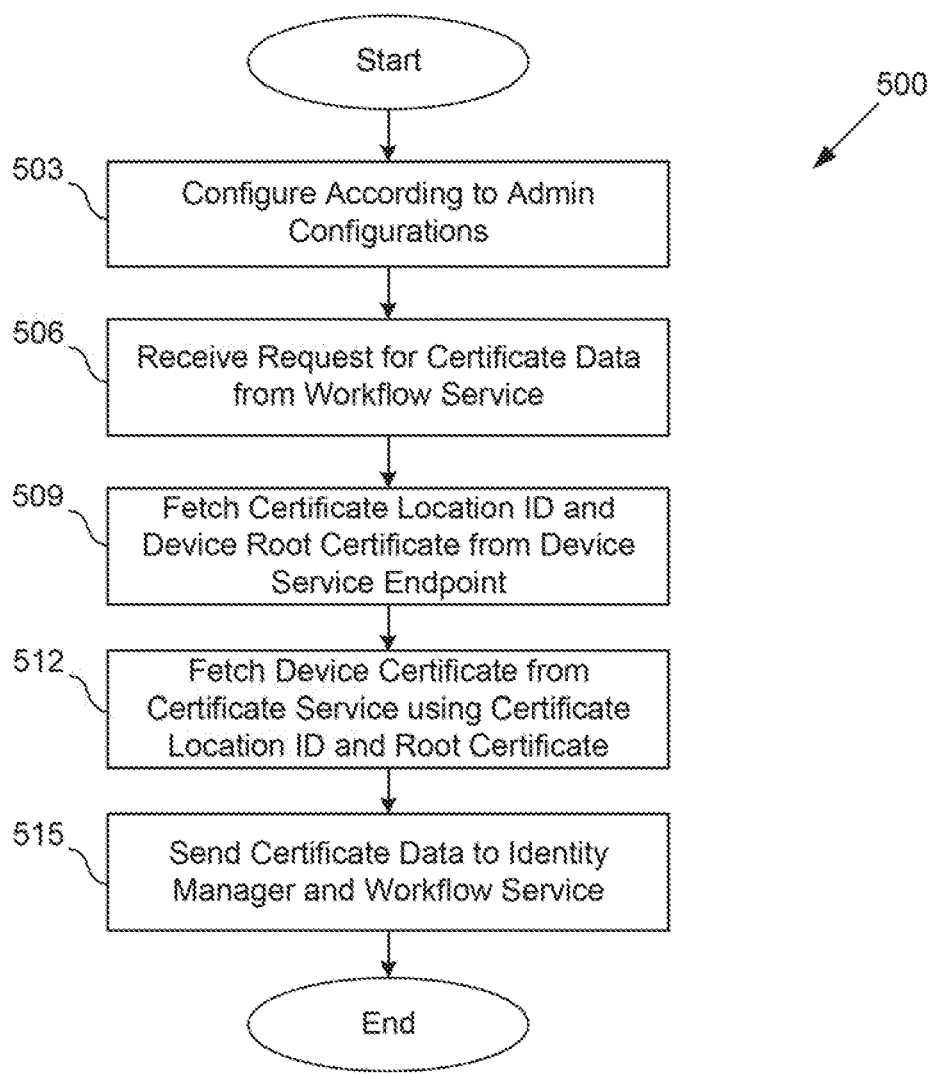
FIG. 5 is a flowchart depicting the operation of an example of a component of the computing environment of the network environment of FIG. 1.

Moving on to FIG. 5, shown is a flowchart 500 that provides one example of the operation of a portion of the network environment 100. The flowchart of FIG. 5 can be viewed as depicting an example of elements of a method implemented by the SSO connector 118, or other components executing in the computing environment 103. The separation or segmentation of functionality as discussed herein is presented for illustrative purposes only.

Beginning with step 503, the SSO connector 118 is configured according to administrator assigned configurations. For example, the administrator can configure the SSO connector 118 with a variety of operational configurations including, for example, an identity manager URL associated with the enterprise, a cert proxy domain and port corresponding to the enterprise, and any other component as can be appreciated. These configurations can allow the SSO connector 118 to retrieve certificate data, including the device root certificate 142 and device certificates 139 from the various services in the computing environment 103. In addition, the configurations can be used by the SSO connector to communicate with the identity manager 112 regarding the issuance of device certificates 139 for device authentication for SSO capabilities to access third-party services 130. The administrator can further configure the SSO connector 118 to define the authentication mechanism that is needed to authenticate a user for SSO. For example, the administrator can configure the SSO connector 118 to ensure that the SSO connector complies with a version of the OAUTH protocol, the SAML protocol or other suitable protocol.

At step 506, the SSO connector 118 receives a request for certificate data from the workflow service 115. The request can include an identity manager token associated with the device and other device data that can be used to identify the requesting device 106.

At step 509, the SSO connector 118 fetches certificate data including, the device root certificate 142 and certificate location identifier from the device services endpoint 121. The device root certificate 142 includes a device-specific root credential that is issued to the client device 106 when the client device 106 is enrolled as a managed device with a management service. The device root certificate 142 is required by the certificate service 124 when issuing a device certificate 139 for the device 106. The certificate location identifier can include a simple certificate enrollment protocol (SCEP) URL or other type of identifier that can be used to obtain a device certificate 139 from the certificate service 124.

At step 512, the SSO connector 118 fetches the device certificate 139 from the certificate service 124. In particular, the certificate service 124 can issue device certificates 139 that can be used for authentication of a client device 106. In particular, the certificate service 124 can use a device root certificate 142 associated with a client device 106 to issue a device certificate 139 that can be used by the identity manager 112 to authenticate a device 106 for SSO capabilities to access one or more third-party services 130.

At step 515, the SSO connector 118 sends the obtained certificate data to the identity manager 112 and to the workflow service 115. For example, the SSO connector 118 can send the certificate data to the workflow service 115 in response to the request for certificate data for a particular device 106. In addition, the SSO connector 118 can be configured to push the device root certificate 142 to the identity manager 112. The device root certificate 142 can be used by the identity manager 112 when authentication the device 106 to access the third-party service 130. As such, the device root certificate 142 can be used by the identity manager 112 during issuance of the SSO token 151 to the client application 154.

The sequence diagrams of FIGS. 2A and 2B and the flowcharts of FIGS. 4 and 5 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-5 and the sequence diagrams of FIGS. 6 and 7 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

What is claimed is:

1. A system for implementing single sign on (SSO) for third-party services accessible through received messages, the system comprising:
a client device comprising a processor and a memory;
a first application executable in the client device, wherein, when executed, the first application causes the client device to at least:
receive an email message associated with a third-party service, the email message including a selectable component configured to redirect a user to the third-party service upon selection, the third-party service requiring authentication of the user for access to content;
send a request for the content associated with the third-party service in response to a selection of the selectable component;
initialize a second application configured to intercept traffic between a network and the first application; and
render a user interface comprising the content associated with the third-party service in response to providing a SSO token to the third-party service for authentication, and
the second application executable in the client device, wherein, when executed, the second application causes the client device to at least:
intercept an authentication request from the third-party service;
redirect the authentication request and a device certificate associated with the client device to an identity manager to obtain the SSO token; and
receive the SSO token from the identity manager.

2. The system of claim 1, wherein, when executed, the first application causes the client device to receive a user request to enable a SSO connector configured to interact with authenticating services.

3. The system of claim 2, wherein, when executed, the first application causes the client device to send a request to the SSO connector for certificate data associated with the client device, the certificate data including a device certificate.

4. The system of claim 2, wherein the SSO connector is configured to comply with an administrator-defined authentication mechanism.

5. The system of claim 1, wherein the selectable component is an embedded uniform resource locator (URL).

6. The system of claim 1, wherein, when executed, the first application causes the client device to at least:
generate a prompt requesting the user to select the selectable component; and
display the prompt on a display of the client device.

7. The system of claim 1, wherein the second application provides the SSO token to the first application in response to receiving the SSO token from the identity manager.

8. A method for implementing single sign on (SSO) for third-party services accessible through received messages, the method comprising:
receiving, by a first application installed on a client device, an email message associated with a third-party service, the email message including a selectable component configured to redirect a user to a third-party service upon selection, the third-party service requiring authentication of the user for access to content;
sending, by the first application, a request for the content associated with the third-party service in response to a selection of the selectable component;
initializing, by the first application, a second application configured to intercept traffic between a network and the first application;
intercepting, by the second application, an authentication request from the third-party service;
redirecting, by the second application, the authentication request and a device certificate associated with the client device to an identity manager to obtain a SSO token;

receiving, by the second application, the SSO token from the identity manager; and rendering, by the first application, a user interface comprising the content associated with the third-party service in response to providing the SSO token to the third-party service for authentication.

9. The method of claim 8, further comprising receiving, by the first application, a user request to enable a SSO connector configured to interact with authenticating services.

10. The method of claim 9, further comprising sending, by the first application, a request to the SSO connector for certificate data associated with the client device, the certificate data including a device certificate.

11. The method of claim 9, wherein the SSO connector is configured to comply with an administrator-defined authentication mechanism.

12. The method of claim 8, wherein the selectable component is an embedded uniform resource locator (URL).

13. The method of claim 8, further comprising:
generating, by the first application, a prompt requesting the user to select the selectable component; and
displaying, by the first application, the prompt on a display of the client device.

14. The method of claim 8, wherein the second application provides the SSO token to the first application in response to receiving the SSO token from the identity manager.

15. A non-transitory computer readable medium for implementing single sign on (SSO) for third-party services accessible through received messages, the non-transitory computer readable medium comprising machine-readable instructions that, when executed by a processor of a client device, cause the client device to at least:
receive, by a first application executed by the client device, an email message associated with a third-party service, the email message including a selectable component configured to redirect a user to a third-party service upon selection, the third-party service requiring authentication of the user for access of content;
send, by the first application executed by the client device, a request for the content associated with the third-party service in response to a selection of the selectable component;
initialize, by the first application executed by the client device, a second application, the second application being configured to intercept traffic between a network and the first application;
intercept, by the second application executed by the client device, an authentication request from the third-party service;
redirect, by the second application executed by the client device, the authentication request and a device certificate associated with the client device to an identity manager to obtain a SSO token;
receive, by the second application executed by the client device, the SSO token from the identity manager; and
render, by the first application executed by the client device, a user interface comprising the content associated with the third-party service in response to providing the SSO token to the third-party service for authentication.

16. The non-transitory computer readable medium of claim 15, wherein the machine-readable instructions, when executed by the processor of the client device, further cause the client device to at least receive, by the first application, a user request to enable a SSO connector configured to interact with authenticating services.

17. The non-transitory computer readable medium of claim 16, wherein the machine-readable instructions, when executed by the processor of the client device, further cause the client device to at least send, by the first application, a request to the SSO connector for certificate data associated with the client device, the certificate data including a device certificate.

18. The non-transitory computer readable medium of claim 15, wherein the selectable component is an embedded uniform resource locator (URL).

19. The non-transitory computer readable medium of claim 15, wherein the machine-readable instructions, when executed by the processor of the client device, further cause the client device to at least:
generate, by the first application, a prompt requesting the user to select the selectable component; and
display, by the first application, the prompt on a display of the client device.

20. The non-transitory computer readable medium of claim 15, wherein the second application provides the SSO token to the first application in response to receiving the SSO token from the identity manager.

* * * * *